(12) United States Patent
Shingo

(10) Patent No.: US 6,845,066 B1
(45) Date of Patent: Jan. 18, 2005

(54) FOCUS CONTROL METHOD AND FOCUS CONTROLLER

(75) Inventor: Imanishi Shingo, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/582,588

(22) PCT Filed: Oct. 27, 1999

(86) PCT No.: PCT/JP99/05929

§ 371 (c)(1),
(2), (4) Date: Sep. 18, 2000

(87) PCT Pub. No.: WO00/25309

PCT Pub. Date: May 4, 2000

(30) Foreign Application Priority Data

Oct. 28, 1998 (JP) .............................. 10-307332
Feb. 19, 1999 (JP) ............................. 11-042366

(51) Int. Cl.[7] .............................. G11B 7/00; G11B 5/55
(52) U.S. Cl. ................................ 369/44.23; 369/44.24; 369/44.25
(58) Field of Search ................................ 369/44, 44.25, 369/13.33, 44.23, 53.18, 44.28, 44.42, 12.26, 44.24, 53.28; 235/487

(56) References Cited

U.S. PATENT DOCUMENTS

| | | | | |
|---|---|---|---|---|
| 5,235,591 A | | 8/1993 | Nakamura | 369/199 |
| 5,448,535 A | * | 9/1995 | Fujita et al. | 369/44.11 |
| 5,451,762 A | * | 9/1995 | Hayashi | 235/487 |
| 5,462,349 A | * | 10/1995 | Grabher | 312/348.1 |
| 5,559,773 A | * | 9/1996 | Kentatsu et al. | 369/44.42 |
| 5,610,885 A | * | 3/1997 | Takahashi | 369/44.28 |
| 5,808,981 A | * | 9/1998 | Suzuki | 369/44.28 |
| 5,946,282 A | | 8/1999 | Hirono | 369/112 |
| 6,016,293 A | * | 1/2000 | Lee et al. | 369/44.25 |
| 6,081,496 A | * | 6/2000 | Otsubo et al. | 369/112.26 |
| 6,185,171 B1 | * | 2/2001 | Bassett et al. | 369/53.18 |
| 6,292,442 B1 | * | 9/2001 | Kasono | 369/44.23 |
| 6,396,776 B1 | * | 5/2002 | Ueyanagi | 369/13.33 |
| 6,404,710 B1 | * | 6/2002 | Ichimura et al. | 369/44.23 |
| 6,449,221 B1 | * | 9/2002 | Knight et al. | 369/13.35 |
| 6,496,468 B2 | * | 12/2002 | Hajjar et al. | 369/13.33 |

FOREIGN PATENT DOCUMENTS

| | | |
|---|---|---|
| JP | 3-214432 | 9/1991 |
| JP | 8-212579 | 8/1996 |
| JP | 11-126345 | 5/1999 |
| JP | 11-203706 | 7/1999 |
| JP | 11-203708 | 7/1999 |
| JP | 11-232675 | 8/1999 |
| JP | 11-250484 | 9/1999 |

\* cited by examiner

*Primary Examiner*—Sinh Tran
*Assistant Examiner*—Glenda P Rodriguez
(74) *Attorney, Agent, or Firm*—Rader, Fishman & Grauer PLLC; Ronald P. Kananen

(57) ABSTRACT

The present invention aims to perform high-accuracy focus control in an optical disk drive, even if a solid immersion lens (SIL) or a solid immersion mirror (SIM) is set between an objective lens and the optical disk in order to increase a numerical aperture, by accurately detecting a change of the distance between an SIL or SIM and an optical disk.

The present invention comprises light detection means (8) for detecting the light incoming to an SIL (2) or an SIM from an objective lens (1) at an incidence angle at which a numerical aperture is larger than 1 and reflected from a plane of the SIL (2) or SIM facing an optical disk, light detection means 10 for detecting the light incoming to the objective lens (1), comparison means (11) for finding a ratio between light amounts of the light detected by light detection means (8) and (10), and control means (11) for controlling operations of a focus actuator in accordance with the ratio.

12 Claims, 10 Drawing Sheets

FOCUS CONTROL METHOD AND FOCUS CONTROLLER

TECHNICAL FIELD

The present invention relates to, for example, a distance-change detecting method for detecting a change of the distance between an optical system and an object to be irradiated (e.g. optical recording medium) and controlling the distance, a distance-change detector, a focus control method, a focus controller, and totally-reflected-light detecting method, particularly to a method and an apparatus to be preferably applied to an optical system provided with optical means for increasing a numerical aperture such as a solid immersion lens or solid immersion mirror.

BACKGROUND ART

Information is recorded or reproduced in or from an optical disk by narrowing down a laser beam to a very-small spot diameter and making the laser beam irradiate a recording surface of an optical recording medium.

To make the laser beam having a certain spot diameter irradiate a recording surface, it is necessary that a distance between an objective lens for condensing the laser beam and an optical disk is kept within a range in which a shift between a focal position of the objective lens and the recording surface falls within a focal depth of the objective lens.

For this reason, an optical disk drive for reproducing data from an optical disk (or recording and reproducing data in and from a rewritable optical disk) or an exposure device for a master optical disk detects a change of the distance between an objective lens and an optical disk, moves the objective lens in the optical-axis direction of a laser beam in accordance with the detection result, and thereby performs control of the distance (focus control).

As the focus control method, for example, the off-axis method, astigmatism method, and knife-edge method have been used so far. All of these methods detect a change of the distance between an objective lens and an optical disk using the light reflected from a signal-recording surface of an optical disk.

To make the spot diameter still smaller in response to needs of high-density optical disk, a numerical aperture larger than that of an objective lens itself (e.g. numerical aperture larger than 1) has recently been realized by intervening an solid immersion lens (SIL) of a shape obtained by cutting off a part of a spherical lens and having a high refractive index between an objective lens and an optical disk facing the spherical surface of the solid immersion lens and the plane opposite to the spherical surface toward the objective lens and optical disk, respectively. Also, it is possible to realize a large numerical aperture by a solid immersion mirror (SIM).

When a numerical aperture is larger than 1, an intensity of a laser beam to irradiate an optical disk extremely lowers if the distance between an SIL and the optical disk exceeds a near field (a range of almost the wavelength of the laser beam). Therefore, it is necessary to perform focus control so that the distance may be kept constant within the range of the near field.

However, in a very small range such as the near field, even if the distance between the SIL and the optical disk changes, a change of the light reflected from the optical disk is very small. Thus, it is difficult to accurately detect a change of the distance between an objective lens and the optical disk in accordance with the change of the reflected light.

Therefore, when setting an SIL between an objective lens and an optical disk, it is difficult to perform high-accuracy focus control by the conventional focus control method.

The same problem occurs in a beam irradiator such as an exposure device used for manufacturing a master optical disk for obtaining an information-recording medium such as an optical disk.

It is an object of the present invention to provide a distance-change detecting method, a distance-change detector, a focus control method and a focus controller, as well as a totally-reflected-light detecting method which enables to perform high-accuracy focus control by accurately detecting a change of the distance between an SIL or SIM and an optical disk even if an optical means for increasing a numerical aperture such as the SIL or SIM is employed.

DISCLOSURE OF THE INVENTION

The present invention proposes a distance-change detecting method for detecting a change of the distance between a second optical means of an optical system having a first optical means for condensing the light to irradiate an optical recording medium and the second optical means set between the first optical means and the optical recording medium in order to realize a numerical aperture larger than the numerical aperture of the first optical means, wherein the light entering the second optical means from the first optical means at an incidence angle at which the numerical aperture is larger than a predetermined value and reflected from a plane of the second optical means facing the optical recording medium is detected and a distance change is detected in accordance with the light amount of the reflected light.

This distance-change detecting method makes it possible to detect the light entering the second optical means from the first optical means at an incidence angle at which a numerical aperture is larger than 1 and reflected from a plane of the second optical means facing the optical recording medium using a solid immersion lens or solid immersion mirror as the second optical means.

The present invention proposes a distance-change detector for detecting a change of the distance between a second optical means and an optical recording medium of an optical system having a first optical means for condensing the light to irradiate the optical recording medium and the second optical means set between the first optical means and the optical recording medium in order to realize a numerical aperture larger than that of the first optical means, the detector comprising a light detection means for detecting the light entering the second optical means from the first optical means at an incidence angle at which the numerical aperture is larger than a predetermined value and reflected from a plane of the second optical means facing the optical recording medium and a detection means for detecting the distance change in accordance with the luminous energy of the reflected light detected by the light detection means.

This distance-change detector makes it possible to arrange that the light detection means can detect the light entering the second optical means from the first optical means at an incidence angle at which a numerical aperture is larger than 1 and reflected from a plane of the second optical means facing the optical recording medium using a solid immersion lens or a solid immersion mirror as the second optical means.

The present invention proposes a focus control method for controlling the distance between a second optical means and an optical recording medium of an optical system having a first optical means for condensing the light to irradiate the optical recording medium and the second optical means set between the first optical means and the optical recording medium in order to realize a numerical aperture larger than that of the first optical means, wherein the light entering the second optical means from the first optical means at an incidence angle at which the numerical aperture is larger than a predetermined value and reflected from a plane of the second optical means facing the optical recording medium is detected, a distance change being detected in accordance with the luminous energy of the reflected light, and the distance being controlled in accordance with the detection result.

The present invention proposes a focus control method of a convergent lens for floating a convergent lens above the surface of an irradiated object by positive-pressure air and attracting the convergent lens toward the irradiated object by negative-pressure air.

This focus control method controls the distance between the convergent lens and the irradiated object by controlling the air pressure.

Moreover, the focus control method using the air pressure makes it possible to drive the convergent lens by an electrical driving means and correct a focal position.

The present invention proposes a focus controller for controlling the distance between a second optical means and an optical recording medium of an optical system having a first optical means for condensing the light to irradiate an optical recording medium and the second optical means set between the first optical means and the optical recording medium in order to realize a numerical aperture larger than that of the first optical means, the controller comprising a light detection means for detecting the light entering the second optical means from the first optical means at an incidence angle at which the numerical aperture is larger than a predetermined value and reflected from a plane of the second optical means facing the optical recording medium, a detection means for detecting the distance change in accordance with the luminous energy of the reflected light detected by the light detection means, and a control means for controlling operations of a focus actuator in accordance with a detection result of the detection means.

Moreover, the present invention proposes a totally-reflected-light detecting method for detecting the light totally reflected from a convergent lens by making a laser beam pass through a polarized-beam splitter and a ¼-wavelength plate and enter the convergent lens including a solid immersion lens or solid immersion mirror, and making the light returned from the convergent lens enter the polarized-beam splitter again to separate the light in a direction different from that of an incoming-beam source.

Furthermore, the present invention proposes a totally-reflected-light detecting method for detecting the light totally reflected from the bottom plane of a convergent lens including a solid immersion lens or solid immersion mirror by arranging an opaque mask on an optical path of the light returned from the convergent lens and interrupting the interference light of the returned light interfering on a plurality of planes including an end face of the convergent lens.

These inventions are proposed for the following reasons.

As already described on an objective lens and an SIL by way of example, when a numerical aperture realized by a first optical means (corresponding to an objective lens) and second optical means (corresponding to an SIL) becomes larger than a predetermined value, the intensity of a laser beam to irradiate an optical recording medium extremely lowers if the distance between the second optical means and the optical recording medium exceeds the near field.

This is because, when the SIL contacts with the optical recording medium, almost all the light (hereinafter also referred to as "high-frequency component" of incoming light) entering an SIL from an objective lens at an incidence angle at which a numerical aperture is larger than a predetermined value permeates a plane of the SIL facing an optical recording medium (hereinafter also referred to as "facing plane") and irradiates the optical recording medium. However, a reflectance of the high-frequency component at the facing plane suddenly increases as the SIL moves away from the optical recording medium and almost 100% of the high-frequency component is reflected from the facing plane when the SIL separates from the optical recording medium exceeding the near field.

In this manner, even in a very small range such as the near field, a change of the light amount of the reflected light of the high-frequency component at the facing plane is sufficiently large.

Therefore, by detecting the reflected light, it is possible to accurately detect a change of the distance between a second optical means and an optical recording medium in accordance with the light-amount change and perform accurate focus control.

The light amount of the reflected light changes proportionally to a change of the intensity of the light incoming to the second optical means (i,e, a change of the intensity of the light emitted from a light source and coming into the first optical means) even if the distance between the second optical means and the optical recording medium is constant.

Therefore, in these distance-change detecting method and distance-change detector, for example, it is more preferable to detect not only the reflected light but also the light incoming to either of the first optical means and the second optical means and find a ratio between light amounts of the reflected light and the incoming light. The distance-change detector further comprises a second light detection means for detecting either of the light incoming to the first optical means and the light incoming to the second optical means and the detection means for detecting the above distance change is comprised of a comparison means for finding the ratio between light amounts of the reflected light detected by the light detection means and the incoming light detected by the second light-detection means.

Even if the intensity of incoming light changes, the above ratio does not change because the light amount of the reflected light and that of the incoming light change at the same rate. Accordingly, it is possible to detect a change of the distance between the second optical means and the optical recording medium regardless of the intensity of the incoming light.

Moreover, the above incoming-light detection can be performed without changing the shape of the facing plane, etc. of the second optical means from a conventional one. Furthermore, in the case of a recording/reproducing apparatus for an optical recording medium or an exposure device for a master disk of the optical recording medium, a monitoring photodetector for controlling an output of a semiconductor laser forming a light source can directly be used as it is to find the above ratio. Therefore, it is possible to minimize the number of devices to be added.

Next, when detecting the reflected light of the high-frequency component at the facing plane, if the light (component other than the high-frequency component) incoming to the second optical means at an incidence angle at which a numerical aperture becomes equal to or less than a predetermined value is also reflected from the facing plane or the light is reflected from a portion of an optical recording medium closer to the second optical means than the signal recording plane of the optical recording medium, a detection accuracy is deteriorated because interference occurs between these lights. As a result, an accuracy for detecting a change of the distance between the second optical means and optical recording medium may be deteriorated.

Therefore, in the distance-change detector, it is more preferable to set, for example, a member for controlling light reflection at least on either of the facing plane of the second optical means and a portion of the optical recording medium closer to the second optical means than the signal recording plane of the medium.

This causes, the interference between the reflected light of the high-frequency component and other light occurring at the facing plane to be decreased. Therefore, deterioration of the detection accuracy of a change of the distance between the second optical means and optical recording medium due to the interference will be suppressed.

When controlling the distance between a convergent lens and an irradiated object using positive-pressure air and negative-pressure air, focus control of a lower-frequency band is stabilized.

When converting a linearly-polarized laser beam emitted through a polarized-beam splitter into a circularly-polarized beam by a ¼-wavelength plate, making then the beam enter a convergent lens, changing the polarized direction of the light returned from the convergent lens by the ¼-wavelength plate, and making the returned light enter the polarized-beam splitter again, it is possible to detect totally-reflected returned light at larger intensity and further reduce noises by separating most of power of the returned light in a direction different from that of an incoming-beam source.

By arranging an opaque mask on an optical path of the light returned from a convergent lens including a solid immersion lens or solid immersion mirror, the intensity of interference light forming noises is controlled and therefore, it is possible to obtain a large ratio of returned light of a high-frequency component, namely, a detection signal to a noise intensity (S/N ratio).

As described above, according to the distance-change detecting method and distance-change detector of the present invention, an advantage can be obtained that it is possible to accurately detect a change of the distance between a second optical means and an optical recording medium in an optical system having a first optical means for condensing the light to irradiate the optical recording medium and a second optical means set between the first optical means and the optical recording medium in order to realize a numerical aperture larger than that of the first optical means, such as an optical system a solid immersion lens set between an objective lens and an optical disk.

Moreover, according to the focus control method and focus controller of the present invention, an advantage can be obtained that it is possible to accurately control the distance between the second optical means and optical recording medium in the above optical system within a range of the near field.

Furthermore, when detecting not only reflected light but also either of the light incoming to the first optical means and the light incoming to the second optical means so as to find the ratio between light amounts of the reflected light and the incoming light, it is possible to detect a change of the distance between the second optical means and optical recording medium irrespective of the intensity of incoming light.

Moreover, the above incoming-light detection can be performed without changing the shape of the facing plane of the second optical means from a conventional one. Furthermore, in the case of a recording/reproducing apparatus for an optical recording medium or an exposure device for a master disk of the optical recording medium, for example, a monitoring photodetector for controlling an output of a semiconductor laser being a light source can be used as it is to find the above ratio. Thus, it is possible to minimize the number of devices to be newly added and the like.

In addition, when setting a member for controlling light reflection at least on either of the facing plane of the second optical means and a portion of the optical recording medium closer to the second optical means than the signal recording plane of the medium, deterioration of an accuracy for detecting a change of the distance between the second optical means and optical recording medium due to the interference between the reflected light of a high-frequency component and other light occurring at the facing plane is suppressed. Therefore, it is possible to more accurately detect the distance change.

When forming an air film between a convergent lens and an irradiated object by positive-pressure air and negative-pressure air and performing focus control by the air film, it is possible to follow a swell in a lower-frequency band of the irradiated object. In other words, it is possible to stably follow the swell at a constant response rate.

Moreover, by controlling an air pressure, it is possible to perform focus control at a higher response rate.

When driving a convergent lens by an electric driving means in focus control and correcting a focal position, it is possible to follow a swell of the irradiated irradiated object in a high-frequency band and perform accurate focus control.

According to a totally-reflected-light detecting method for detecting the light totally-reflected from a convergent lens by making a laser beam pass through a polarized-beam splitter and a ¼-wavelength beam splitter and enter the convergent lens, making the light returned from the convergent lens enter the polarized-beam splitter again, and separating the returned light in a direction different from that of an incoming-beam source, it is possible to detect totally-reflected returned light at the large intensity.

According to a totally-reflected-light detecting method for detecting the light totally-reflected from the bottom plane of a convergent lens by arranging an opaque mask on an optical path of the light returned from the convergent lens and interrupting the light of the returned light interfering on a plurality of planes including an end face of the convergent lens, it is possible to control the intensity of interference light forming noises and detect the totally-reflected returned light of a high-frequency component.

Therefore, when applying the method to focus control, it is possible to obtain a large ratio of detection-signal intensity to noise intensity (S/N ratio) in focus control, thus making the control to be performed with higher accuracy.

BEST MODE FOR CARRYING OUT THE INVENTION

In the following, an example of applying the present invention to an optical disk drive will be described.

Figure 1:
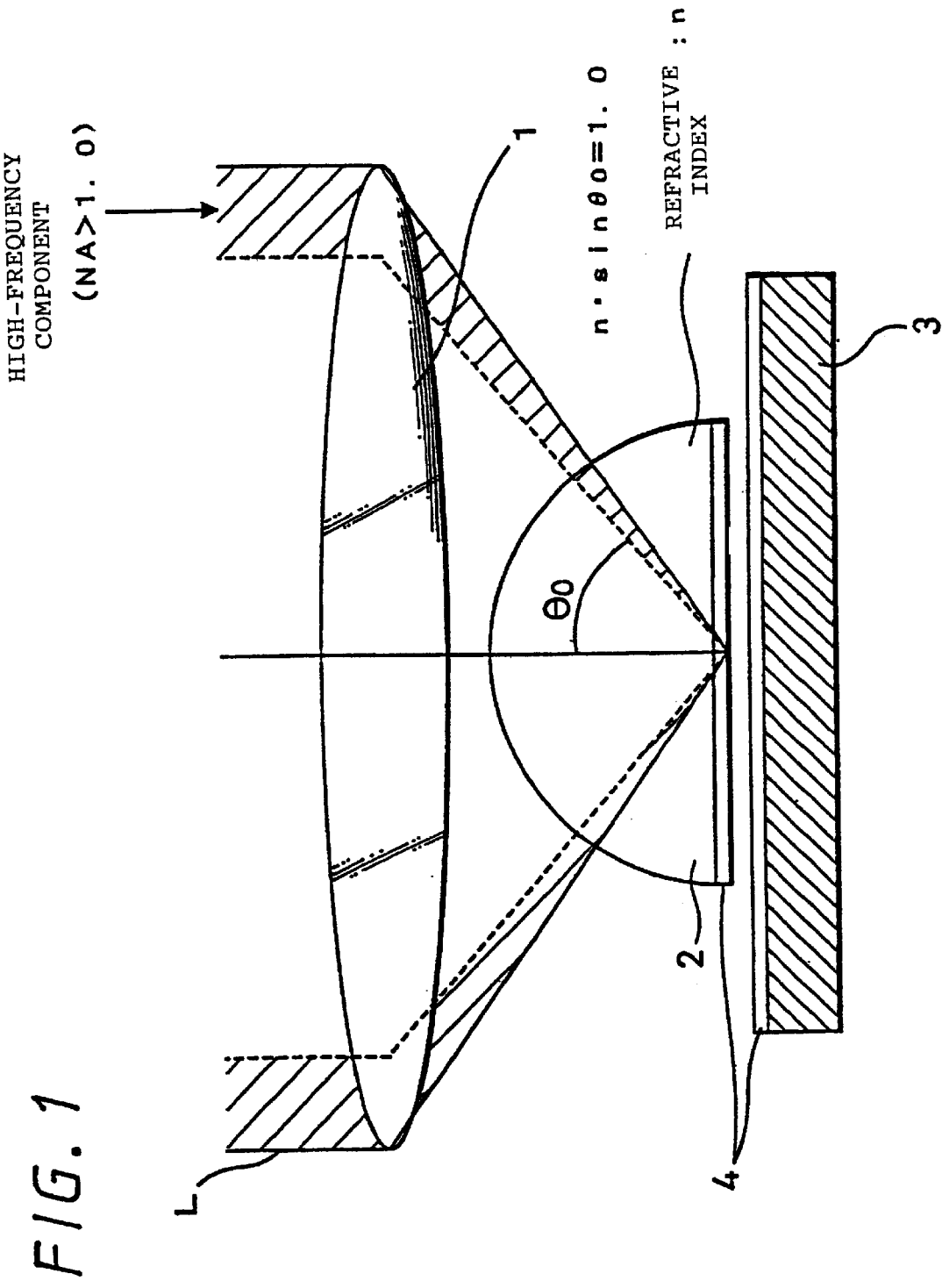
FIG. 1 is a side view showing by way of example an optical system of an optical disk drive to which the present invention is applied and an optical disk set on the optical disk drive.

FIG. 1 shows by way of example an optical system provided in an optical pickup of an optical disk drive in order to condense a laser beam to be irradiated to an optical disk and an optical disk set on the optical disk drive.

This optical system comprises an objective lens 1 for condensing a laser beam L and a solid immersion lens (SIL) 2 set between an optical disk 3 and the objective lens 1. The objective lens 1 and the SIL 2 are integrally moved by a focus actuator (not illustrated) in the optical-axis direction of the laser beam L.

The SIL 2 is a lens formed by cutting off a part of a spherical lens in shape and having a refractive index n, which is set so that its spherical surface may be faced toward the objective lens 1 and the plane opposite to the spherical surface may be faced toward the optical disk 3.

The relation between an numerical aperture NA realized by the objective lens 1 and SIL 2, a refractive index n of the SIL 2, and a maximum incidence angle $\theta_{max}$ of the laser beam L condensed by the objective lens 1 to the SIL 2 is shown by the following expression as is well known.

$$NA = n \cdot \sin \theta_{max}$$

In this example, the refractive index n and the maximum incidence angle $\theta_{max}$ are set so that a product $n \cdot \sin \theta_0$ including a certain incidence angle $\theta_0$ smaller than the maximum incidence angle $\theta_{max}$ and the refractive index n may be equal to 1 as shown in FIG. 1.

As a result, a numerical aperture larger than 1 is realized by the objective lens 1 and SIL 2. Therefore, when the SIL 2 contacts with the optical disk 3, almost all the laser beam (high-frequency component)(laser beam at the hatched portion in FIG. 1) incoming to the SIL 2 from the objective lens 1 at an incidence angle larger than $\theta_0$ (i,e, an incidence angle at which a numerical aperture becomes larger than 1) permeates a plane of the SIL 2 facing the optical disk 3 and is irradiated to the optical disk 3. However, as the SIL 2 moves away from the optical disk 3, a reflectance of the high-frequency component at the facing plane suddenly increases. When the SIL 2 moves away from the optical disk 3 beyond the near field, almost 100% of the high-frequency component is reflected from the facing plane.

An antireflection film 4 is formed on the facing plane of the SIL 2 for controlling the reflection of a laser beam incoming to the SIL 2 at an incidence angle of $\theta_0$ or less (component other than high-frequency component) (i,e, an incidence angle at which a numerical aperture becomes 1 or less.

Also, the antireflection film 4 is formed on a portion of the optical disk 3 closer to the SIL 2 than the signal recording plane of the disk 3 (e.g. the surface facing the SIL 2).

In this way, the reflection of the laser beam incoming to the SIL 2 at an incidence angle equal to or smaller than $\theta_0$ from the facing plane of the SIL 2 and the reflection of the laser beam from a portion of the optical disk 3 closer to the SIL 2 than the signal recording plane of the disk 3 are suppressed.

Figure 2:
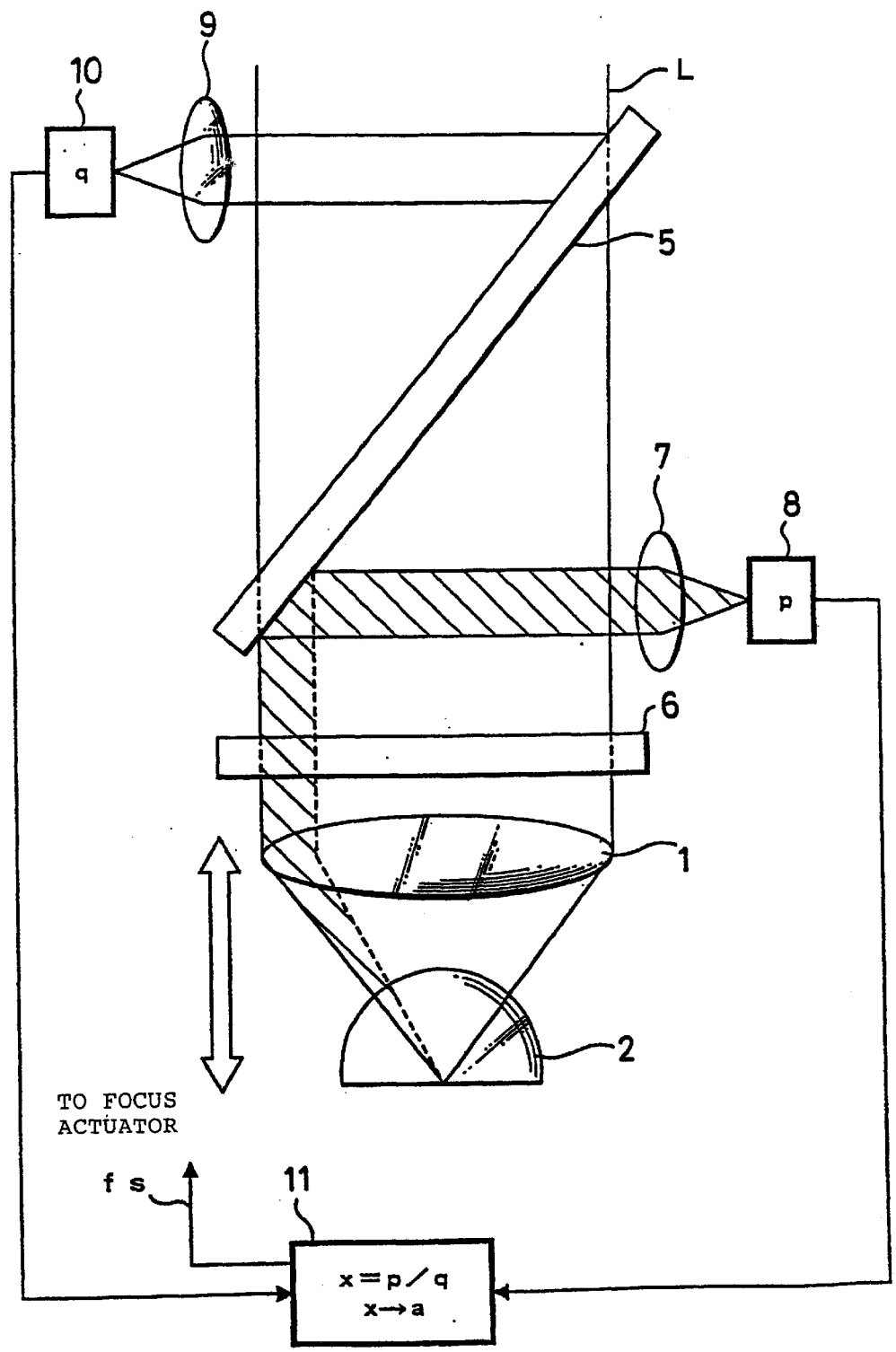
FIG. 2 is an illustration showing by way of example a part of an optical pickup of an optical disk drive to which the present invention is applied and a focus control system of the optical disk drive.

FIG. 2 shows an example of a portion of the optical pickup relating to the present invention and a focus control system of the optical disk drive.

A linearly-polarized laser beam L emitted from a semiconductor laser (not illustrated) is converted into parallel rays by a collimator lens (not illustrated) in the optical pickup, and a polarized plane of the parallel rays is rotated by a ½-wavelength plate (not illustrated) before the parallel rays enter a polarized-beam splitter (PBS) 5.

A part of the incoming beam is reflected from the PBS 5 and detected by a photodetector (PD) 10 for monitoring the intensity of the laser beam through a condenser lens 9.

Moreover, most of the beam incoming to the PBS 5 passes through the PBS 5 and is converted into circularly-polarized rays by a ¼-wavelength plate 6 to be condensed by the objective lens 1, and enters the SIL 2.

A photodetector (PD) 8 is provided through a condenser lens 7 on an optical path where the above laser beam incoming to the SIL 2 from the objective lens 1 at an incidence angle larger than $\theta_0$ (high-frequency component) (laser beam at the hatched portion in FIG. 2) is reflected from the facing plane of the SIL 2, passes through the objective lens 1, converted into a linearly polarized light orthogonal to the initial one by the ¼-wavelength plate 6, and reflected from the PBS 5.

Thus, the reflected light of the high-frequency component at the facing plane of the SIL 2 is detected by the PD 8.

A signal showing a light amount p detected by the PD 8 is sent to an arithmetic circuit 11.

A signal showing a light amount q detected by the PD 10 is also sent to a circuit (not illustrated) for controlling an output of a semiconductor laser and also sent to the arithmetic circuit 11.

The arithmetic circuit 11 stores a value a of the ratio between p and q when the distance between the SIL 2 and the optical disk 3 is equal to a certain distance m at which the reflectance of the high-frequency component at the facing plane of the SIL 2 is small enough (i,e, the high-frequency component is sufficiently irradiated to the optical disk 3) as a control target value.

The arithmetic circuit 11 computes the ratio x between the light amounts p and q. When the sign of the difference x-a between the x and the control target value a is positive (i,e, when the distance between the SIL 2 and optical disk 3 is larger than m), the circuit generates a signal for controlling the movement of a focus actuator (not illustrated) so as to make the objective lens 1 and SIL 2 move in a direction for approaching the optical disk 3 by a distance corresponding to the difference magnitude. On the other hand, when the sign of x-a is negative (i,e, when the distance between the SIL 2 and optical disk 3 is smaller than m), the circuit generates a signal for controlling the movement of the focus actuator so as to make the objective lens 1 and SIL 2 move in a direction for going away from the optical disk 3 by a distance corresponding to the difference magnitude and sends the control signal fs to the focus actuator.

The focus control operation by the optical disk drive is performed as follows.

When a laser beam is emitted from a semiconductor laser, the partial light amount q of the laser beam is detected by the PD 10, and the light amount p of the reflected light of the high-frequency component at the facing plane of the SIL 2 is detected by the PD 8.

When the distance between the SIL 2 and optical disk 3 is larger than the above value m, the sign of the difference x-a is positive because the light amount of the reflected light of the high-frequency component at the facing plane of the SIL 2 increases and so, the ratio x becomes larger than the control target value a.

Therefore, at this moment, the objective lens 1 and SIL 2 are moved by the focus actuator in a direction of approaching the optical disk 3 by a distance corresponding to the value of the difference x-a on the basis of the control signal from the arithmetic circuit 11.

However, when the distance between the SIL 2 and optical disk 3 is smaller than m, the light amount of the reflected light of the high-frequency component at the facing plane of the SIL 2 decreases, so that the ratio x becomes smaller than the control target value a, and thus the sign of the difference x-a turns negative.

Therefore, at this moment, the objective lens 1 and SIL 2 are moved by the focus actuator in a direction of going away from the optical disk 3 by a distance corresponding to the value of the difference x-a.

In this way, focus control is performed so that the ratio x may converge on the control target value a (i,e, the distance between the SIL 2 and optical disk 3 may converge on m).

In this case, because a change of the light amount of the reflected light of the high-frequency component at the facing plane of the SIL 2 is large enough even in the near field range, it is possible to perform precise focus control by accurately detecting a change of the distance between the SIL 2 and optical disk 3 from a detection result by the PD 8.

Moreover, even if the intensity of a laser beam emitted from a semiconductor laser changes, p and q change at the same rate, so that the ratio x does not change. This makes it possible to detect a change of the distance between the SIL 2 and optical disk 3 regardless of the intensity of the laser beam.

Furthermore, a shape of the SIL 2 does not change at all from a conventional one and besides, the monitoring PD 10 for controlling an output of a semiconductor laser is used as it is to find the ratio x. Therefore, the number of new devices to be added is minimized.

Also, reflection of a laser beam incoming to the SIL 2 at an incidence angle of $\theta_0$ or less at the facing plane of the SIL 2 and reflection of a laser beam at a portion of the optical disk 3 closer to the SIL 2 than a signal recording plane of the disk 3 are suppressed by the antireflection film 4, so that interference between the reflected light of the high-frequency component and other light at the facing plane of the SIL 2 decreases. Thus, deterioration of an accuracy for detecting a change of the distance between the SIL 2 and optical disk 3 due to the above interference is prevented. This point also makes it possible to more accurately detect a change of the distance.

Additionally, in the above example, the present invention is applied to an optical disk drive having an optical system in which an SIL is set between an objective lens and an optical disk.

However, the present invention may be applied not only to the above optical disk drive but also to an optical disk drive having an optical system realizing functions of an objective lens and an SIL by a single optical device, an optical system realizing functions of an objective lens and an SIL by three or more optical devices, and an optical system realizing functions of an objective lens and an SIL by a hologram device.

Moreover, the above example has been described assuming that the present invention is applied to an optical disk drive. However, the present invention is also applicable to an exposure device for a master optical disk or to a recording/reproducing apparatus of an optical recording medium other than an optical disk or an exposure device for a master disk of that optical recording medium.

Next, an example of a beam irradiator will be described, which is applied to an optical unit serving as a pickup unit of an optical disk drive, or an exposure device for a master disk of an information recording medium such as an optical recording medium (e.g. optical disk) and others.

Also, a focus control method, a totally-reflected-light detecting method and the like to be applied to the beam irradiator will be described.

In an optical recording medium (e.g. optical disk), it is necessary to drive a convergent lens used for recording or reproducing information and perform focus control so that an information recording layer may always fall within the focal depth of the convergent lens. The same applies to a case of exposing a master optical disk.

As a wavelength of light used for an optical recording medium has recently been shortened, a focal depth of a spot has been shallowed even if a numerical aperture NA of a convergent lens is the same and therefore, more-stable focus control has been essential.

Thus, the present invention intends to perform low-frequency-band focus control utilizing an air suspension according to simultaneous use of positive-pressure air and negative-pressure air and also to add high-frequency-band focus control by shift means using an electrical driving element for performing more-stable focus servo.

Figure 3:
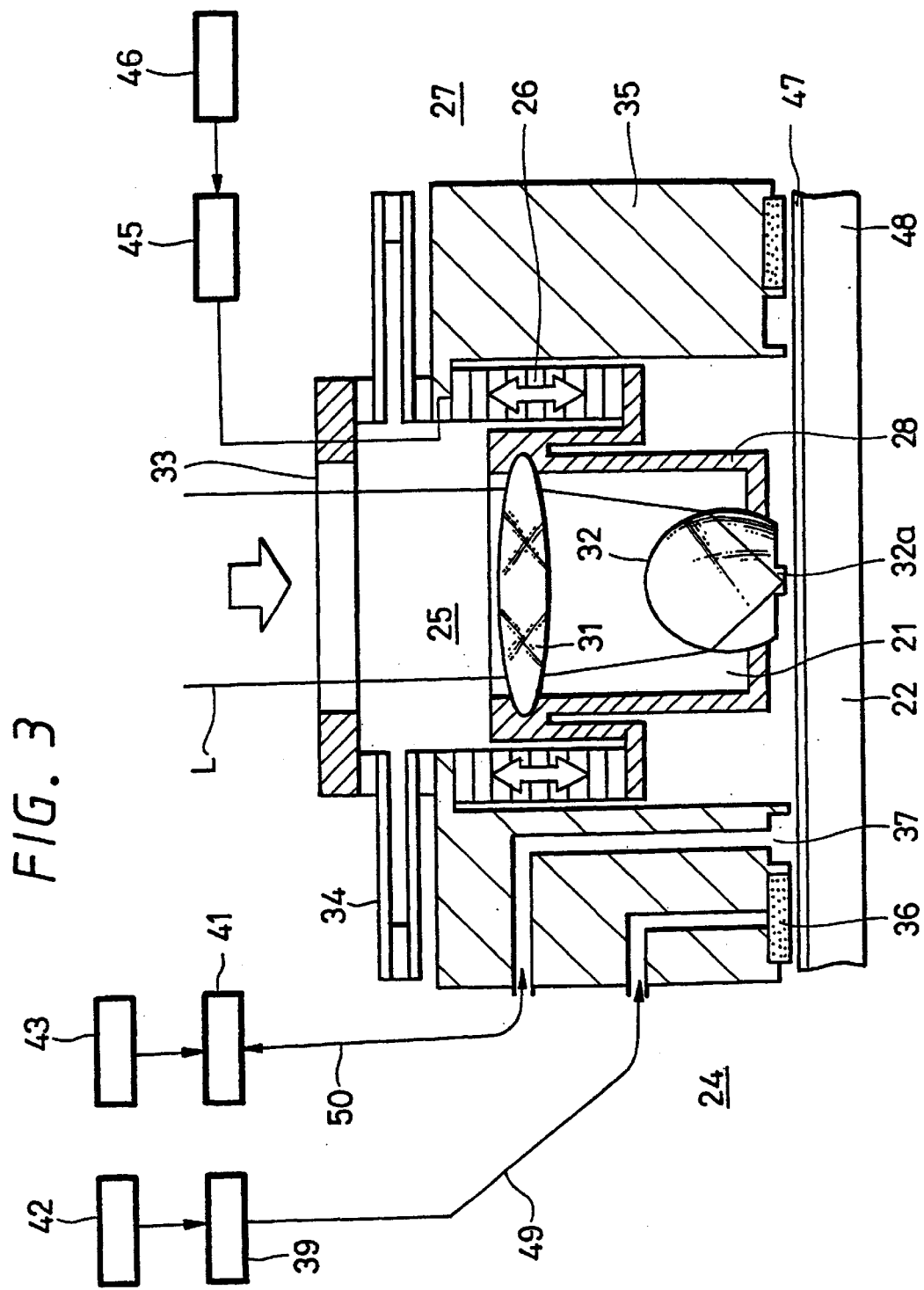
FIG. 3 is a schematic sectional view of a convergent lens portion of a beam irradiator using the present invention.

FIG. 3 shows an example of a schematic structure of a focus control mechanism of a convergent lens of a beam irradiator using the present invention, which is adapted for these purposes.

The beam irradiator is provided with a beam generating source for generating at least any one of a light beam, an electron beam and an ion beam as well as a convergent lens for converging a beam supplied from the beam generating source. In FIG. 3, a numeral 21 denotes a convergent lens and 22 denotes an irradiated object.

The focus control mechanism of this example is able to perform the focus control of the convergent lens 21 by combining a first control mechanism 24 for performing focus control in a low-frequency band (for so-called low-frequency swell of the irradiated object 22) by positive-pressure air (high-pressure air) and negative-pressure air with a second control mechanism 25 for performing focus control in a high-frequency band (for so-called high-frequency swell of the irradiated object 22) using, e,g, a piezostack forming the shift means 26.

The convergent lens 21 is fixed to an actuator 27 whose position is adjusted relative to the irradiated object 22 such as a disk set on a rotational base. The actuator 27 is provided with the first and second focus control mechanisms 24 and 25. The convergent lens 21 has an objective lens (aspherical lens) 31 and an SIL 32 held in a lens tube 28 on the same optical axis. The SIL 32 of this example has a shape obtained by cutting off a part of a spherical lens to leave more than a hemisphere and has a columnar protrusion 32a formed at the bottom thereof.

The actuator 27 is formed by fixing a cylindrical air pad 35 to be floated from the irradiated object 22 by intervention of an air layer to an arm (so-called lens fixing setting jig) 33 through an elastic body 34 such as a flat spring. The shift means 26 using a cylindrical piezostack is fixed to the upper end in the air pad 35. The lens tube 28 holding the convergent lens 21 is supported in the cylindrical air pad 35 through the shift means 26, and the bottom end face of the SIL 32 (i,e, end face of the columnar protrusion 32a) is set to a plane of the air pad 35 facing the irradiated object 22.

An air jet port (air supply port) for jetting air, a so-called positive-air jet port 36 and an air intake port for taking in air, a so-called negative-pressure intake port 37 are provided on a plane of the air pad 35 facing the irradiated object 22.

Figure 4:
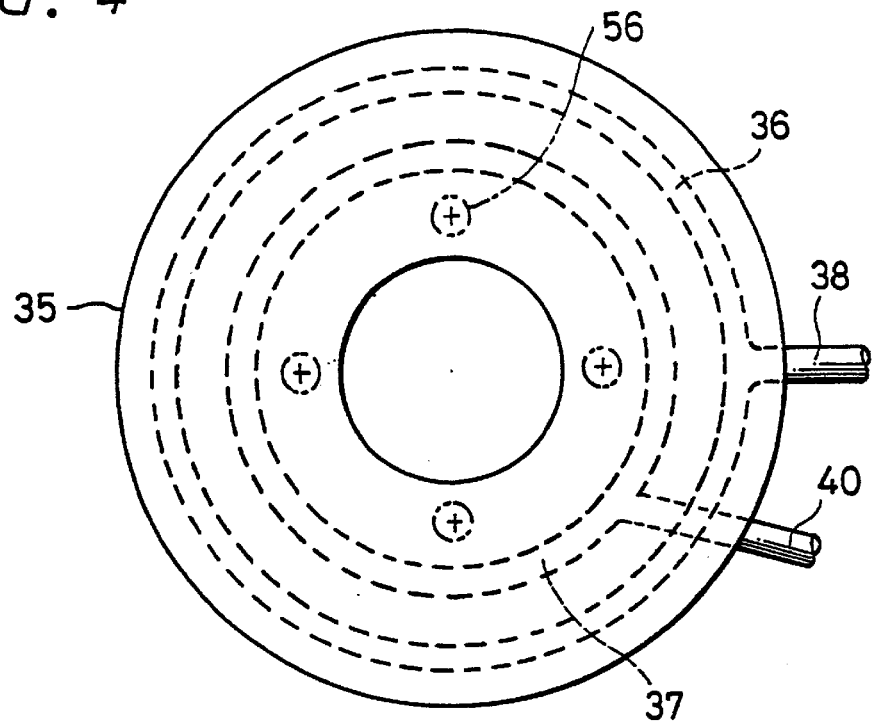
FIG. 4 is a top view of an example of essential portion of a focus control mechanism in an apparatus of the present invention.

As shown in FIG. 4 for example, the air jet port 36 and air intake port 37 are formed annularly and concentrically to the central axis of the air pad 35. The air jet port 36 can be made of a porous member such as porous carbon. The porous carbon is fitted to an annular groove formed on the face of the air pad 35.

High-pressure air is supplied from a high-pressure air supply source 39 to the air jet port 36 through a pipe 38. Air is taken into an air intake means 41 from the air intake port 37 through a pipe 40.

A high-pressure-air supply source 39 is provided with as control means 42 for controlling, for example, supply quantity and pressure of the air and the air intake means 41 is provided with a control means 43 for controlling, for example, intake quantity and pressure of the air. The positive-pressure air and negative-pressure air perform initial rough adjustment for making the bottom end face of the convergent lens 21 face the irradiated object 22 while keeping a necessary distance. In this manner, the first focus control mechanism 24 for selecting a position of the convergent lens 21 is constructed.

Moreover, a voltage is supplied to, for example, the piezostack forming the shift means 26 from a voltage supply section 45 so as to minutely move the convergent lens 21 a long the axis of the air pad 35 in accordance with the displacement due to the piezoelectric effect of the piezostack. In this way, the second focus control mechanism 25 for making position control of the convergent lens 21, i,e, focus control relative to the irradiated object 22 is constructed.

The voltage supply section 45 supplies a voltage corresponding to a focus error to, for example, the piezostack forming the shift means 26 in accordance with a focus servo signal supplied from a detection section 46 for detecting a focus error.

Figure 5:
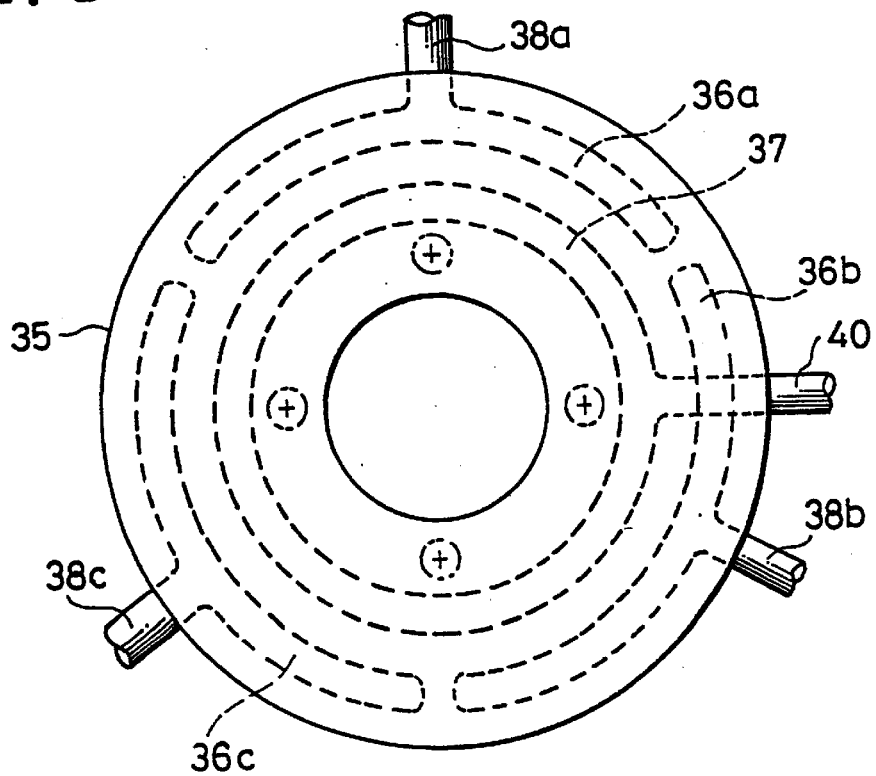
FIG. 5 is a top view of another example of essential portion of a focus control mechanism in an apparatus of the present invention.

In addition, it is possible to make the air jet port 36 divided into a plurality of ports, e,g, three ports in this example as shown in FIG. 5, so as to supply high-pressure air to air jet ports 36a, 36b, and 36c through pipes 38a, 38b, and 38c, respectively. as shown in FIG. 5. In this case, it is also possible to provide high-pressure-air supply source and control means for then respective pipes 38a, 38b, and 38c so that air pressure and air supply quantity of each port can be controlled. Also, it is possible to divide the air intake port 37 into a plurality of ports so as to take in air from each port.

Furthermore, though not illustrated, it is possible to make the air jet port 36 and air intake port 37 of a multiplicity of openings along a circle instead of limiting them to the annular shape.

The focus control mechanism comprised of the first and second focus control mechanisms 24 and 25 float the air pad 35 above the irradiated object 22 (for example, a base plate 48 whose surface is coated with a photoresist layer 47) using a pressure of positive-pressure air. Specifically, the air pad 35 is floated above the irradiated object 22 by jetting positive-pressure air from the bottom plane of the air pad 35 through the air jet port 36 and attracted toward the irradiated object 22 by negative-pressure air taken in through the air intake port 37. By setting a pressure of positive-pressure air at, e,g, 5 kgf and a pressure of negative-pressure air at, e,g, a value equal to atmospheric pressure—100 mmHg, it is possible to float the air pad by, e,g, 5 $\mu$m.

Though the air pressure is fixed in this case, rigidity is produced in an air film formed between the irradiated object 22 and the air pad 35 due to a balance of the positive and negative pressure of air. When a swell of the surface of the irradiated object 22 is associated with a low-frequency band, the air pad 35 can follow the swell. Therefore, a response speed of the air pad 35 shifting in accordance with a vertical displacement of the irradiated object 22 will be constant for both upward and downward displacements.

On the other hand, by applying a voltage to, e,g, the piezostack forming the shift means 26 to extend or contract the piezostack, it is possible to apply servo corresponding to a high-frequency-band swell which cannot be followed by the air pad 35 only as described above and perform high-frequency-band position control, namely, focus control.

Because the air pad 35 is fixed to the arm 33 through the elastic body 34 using a dogleg-shaped or U-shaped flat spring, it is possible to give freedom from not only a vertical direction but also a tilt to the air pad 35.

According to a beam irradiator provided with the above focus control mechanism, stable focus control in a low-frequency band is enabled by simultaneously using positive-pressure air 49 and negative-pressure air 50. At the same time, a constant response speed is also obtained. Because the focus control mechanism is separated into a high-frequency band and a low-frequency band, the improvement of a servo characteristics in each band is expected. Therefore, it is possible to keep the distance between the convergent lens 21 and the irradiated object 22 accurately and stably.

In the present invention, the convergent lens 21 is comprised of two lens groupes including the SIL 32 and the objective lens 31. However, the convergent lens 21 may be made of any lens which converges a light beam (e.g. laser beam),e,g, objective lens formed by an SIM (solid immersion mirror) 51 shown in FIG. 6, a lens group including an SIM, or other objective lens formed by three groups or more having been used so far. In this case also, it is possible to stably perform servo with the same accuracy as the above.

Figure 6:
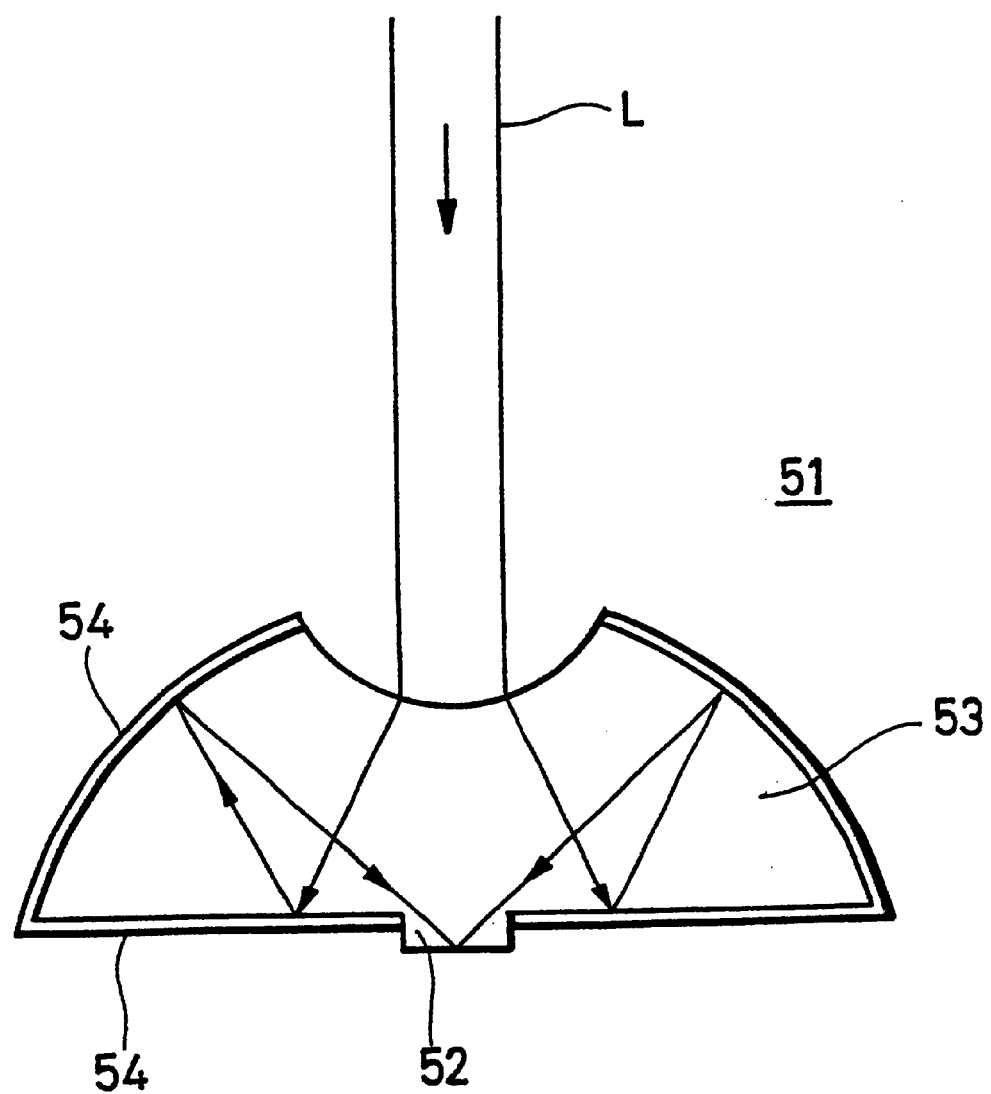
FIG. 6 is a sectional view of an SIM used in a convergent lens of an apparatus of the present invention.

As concerns the SIM 51, an light-beam-L incoming side has a concave face, but a light-beam-L incident portion has a convex face as shown in FIG. 6. A light-beam-L emitting side has a flat face. In this case, the flat face is a plane in which the columnar protrusion 52 is provided at the center thereof as described above. A reflection film 54 is formed on a convex face of the transparent body 53 formed and the flat face of the body 53 excluding the columnar protrusion 52.

The light beam L enters the concave face and is refracted. It is then reflected from the reflection film 54 at the flat face, further reflected from the reflection film 54 on the upper convex face, and converged on the end face of the columnar protrusion 52.

Although the present invention uses a piezostack being as an electrical driving element as the shift means 26 for focus control in a high-frequency band, other electrical driving element such as an electromagnetic coil, so-called voice coil may be used.

While pressures of positive-pressure air and negative-pressure air are fixed in the above example, the air pressures may be controlled. When the air pressures is fixed, the air pad 35 vertically follows in accordance with a vertical displacement of the irradiated object 22. In order, to further accelerate the follow, it is also possible to increase the response speed of the air pad 35 by increasing the pressure of negative-pressure air when the irradiated object 22 shifts downward and increasing the pressure of positive-pressure air when the object shifts upward.

In the above example, focus servo in a lower-frequency band by air and focus servo in a high-frequency band by the piezostack of the shift means 26 are used at the same time. However, when a high-frequency-band swell of a face on which light is condensed by the convergent lens 21 is small, it is allowed to use only servo by air.

When oscillating a 350-nm laser beam used mainly at the recent exposing step of a master optical disk by an SHG (Secondary Harmonic Generator), its wavelength is approx. 170 nm. The sensitivity of photoresist becomes effective at a wavelength of approx. 450 nm or less. In view of these facts, a beam irradiator using the present invention is preferably provided with a generator for producing a laser beam having a wavelength between 170 and 450 nm inclusive.

The so-called attract-flat-type air pad 35 using positive-pressure air and negative-pressure air shown in FIG. 3 well follows a swell on the surface of the object 22 to be irradiated.

However, if the air jet port 36 and air intake port 37 of the attract-float-type air pad 35 are improperly arranged, for example, if the air intake port 37 is concentrically set outside the annular air jet port 36 set on the bottom of the air pad 35 the air pad 35 tilted due to very small vibration is further tilted because of the air intake port 37 present on the outer periphery and the edge of the air pad 35 may contact with the object 22 to be irradiated. Therefore, it is necessary to carefully arrange these air jet port 36 and air intake port 37.

Moreover, when the air pad 35 is floated, only the air jet port 36 descends onto the object 22 to be irradiated. In this case, if the tip end of the convergent lens 21 protrudes beyond the bottom of the air pad 35, the convergent lend 21 may collide with the object 22 to be irradiated. Therefore, it is necessary to take countermeasure for avoiding collision.

Furthermore, the outer periphery of the front end of the SIL 32 set on the air pad 35 is scraped through etching while leaving the columnar protrusion 32a having, e,g, a diameter of 40 μm and a height of 2 μm. This reduces, the probability for the lens, i,e, the SIL 32 to contact with the irradiated object 22 when the lens tilts. Still, to decrease the distance (so-call gap) between the convergent lens 21 and the irradiated object 22 down to, e,g, approx. 40 nm, it is necessary to previously adjust a tilt of the convergent lens 21 with an accuracy of 1 mrad or less. A method and an apparatus for facilitating the above adjustment with high accuracy is desired.

Thus, a beam irradiator concerning the present invention is constructed so that an air jet port provided for the lowermost portion, i,e, the bottom of an attract-float-type air pad using air pressure may be arranged outside an air intake port.

Moreover, the beam irradiator is constructed so as to retreat, in the initial state the lowermost face (e.g. bottom of an SIL or SIM) of a convergent lens up to a position higher than the height from the surface of an irradiated object to the bottom of an air pad and then lower the lowermost face of the convergent lens down to a position lower than the height from the surface of the irradiated object to the bottom of the air pad during beam irradiation (e.g. when exposing a master disk or recording or when reproducing data in or from an information recording medium).

A lens-tilt adjuster used for the present invention is arranged so as to have a mechanism for adjusting a tilt when fixing an convergent lens by a screwing pressure through an elastic member inserted between contact faces for fixing the convergent lens to shift means and/or contact faces for fixing the shift means provided with the convergent lens to an air pad.

A lens-tilt adjusting method used for the present invention sets a convergent lens on a substrate having a high reflection surface and adjusts a tilt of a convergent lens, so-called the optical axis of the lens by conforming the axis of returned light reflected from the bottom of the convergent lens (e.g. convergent lens including SIL or SIM) with the axis of returned light which is reflected from the high reflection surface of the substrate after permeating the convergent lens and permeates again the same lens.

A method using returned light totally reflected from the bottom plane of the SIL 32 (bottom of the columnar protrusion 32a) is one of the signal detection methods when controlling the distance between the convergent lens 21 and the irradiated object 22 by making the distance close to a near field (close-field area). In this case, because control is performed at a position where the intensity of totally-reflected returned light is small, it is necessary to detect the totally-reflected returned light at larger intensity and also decrease noises.

A totally-reflected-light detecting method according to the present invention separates most of returned-light power in a direction different from that of an incoming-beam source by converting linearly-polarized laser beam emitted through a polarized-beam splitter into circularly-polarized rays by a ¼-wavelength plate making thereafter, the circularly-polarized enter a convergent lens, changing the polarization direction of the light returned from the convergent lens by the ¼-wavelength plate, and making the returned light enter the polarized-beam splitter again.

Furthermore, the totally-reflected-light detecting method mainly pass the light totally reflected from the bottom face of a convergent lens (SIL or SIM lens) by arranging a circular mask on an optical path of the light returned from the convergent lens, which is adjusted to the optical axis of the convergent lens, and has a circular transmission area or has a transmission area on the outer periphery, and interrupting the light interfering on a plurality of faces including the bottom face of the convergent lens.

Figure 7:
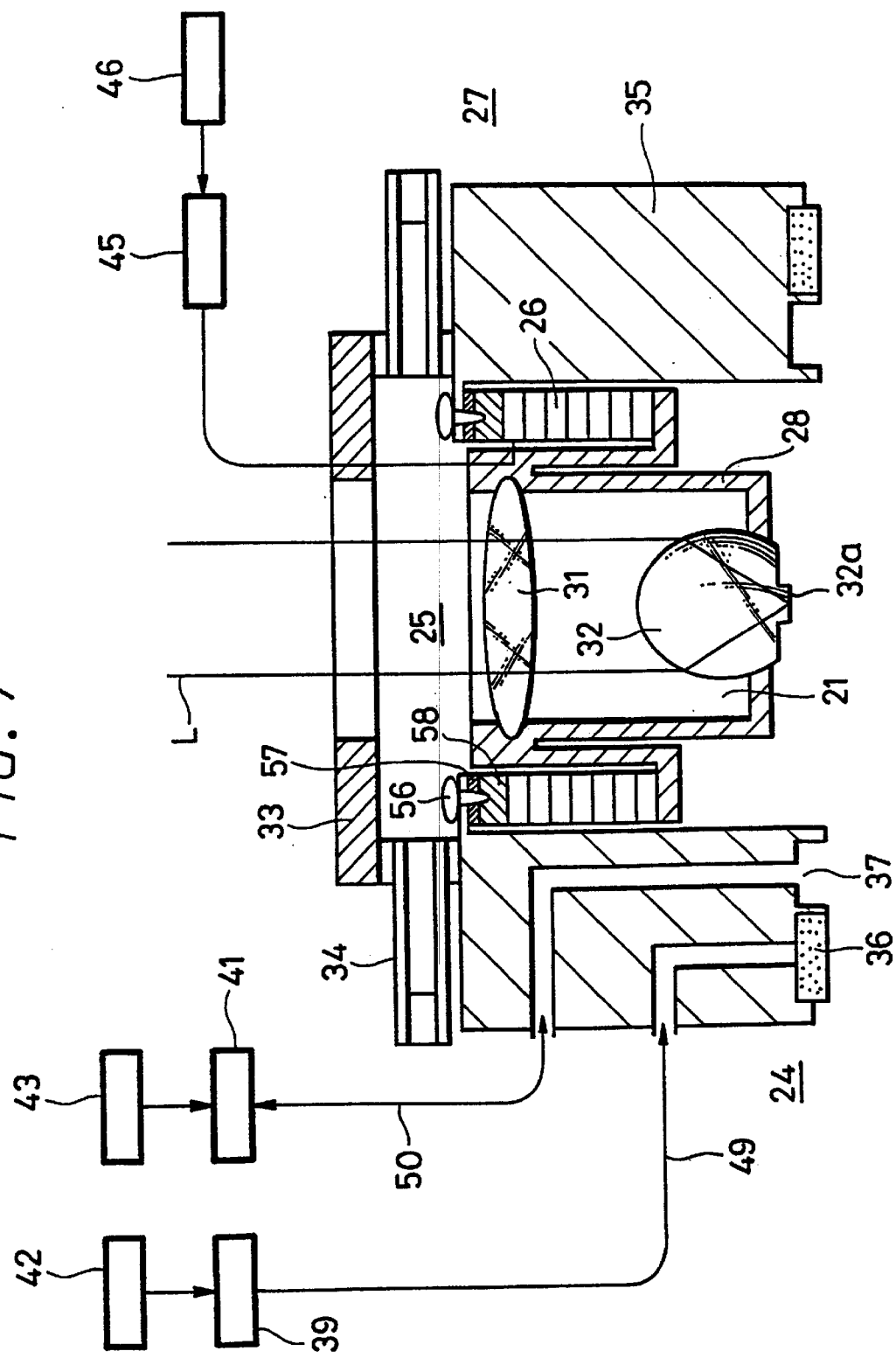
FIG. 7 is a schematic sectional view of another convergent lens portion of a beam irradiator using the present invention.

FIG. 7 shows a schematic structure of another example of focus control mechanism of a convergent lens in a beam irradiator thus improved by the present invention.

Also, FIGS. 8 to 11 show an example of performing optical-axis adjustment and focus control of a convergent lens using the lens-tilt adjusting method and the totally-reflected-light detecting method.

In this example, as shown in FIG. 7, a cylindrical air pad 35 having a jet port 36 of positive-pressure air 49 and an intake port 37 of negative-pressure air 50 on the facing plane facing an irradiated object 22 is fixed to an arm 33 through an elastic body 34 such as a flat spring similarly to the case of FIG. 3, and a lens tube 28 holding a convergent lens 21 is supported inside the air pad 35 through an annular piezostack serving as shift means 26 so as to shift in the axis direction.

The air jet port 36 and air intake port 37 are each formed annularly, i,e, concentrically around the axis of the air pad 35, and particularly the air jet port 36 is provided so as to be located on the outer periphery of the air intake port 37.

The convergent lens 21 is constructed so as to hold an objective lens 31 and an SIL 32 on the same optical axis similarly to the case described above. The convergent lens 21 is set so that the bottom of the SIL 32 may retreat from the bottom plane of the air pad 35 facing the irradiated object 22 in the initial state, i,e, when no voltage is applied to the piezostack of the shift means 26, but can protrude beyond the bottom plane of the air pad 35 and extend by a float amount or over when a voltage is applied to the piezostack of the shift means 26.

An elastic member elastic in the thickness direction, preferably an elastic sheet such as a gel-type sheet 57 is set on the face fixing the piezostack being the shift means 26 to the air pad 35 so as to make the piezostack and the air pad 35 into one body by a screw 56 at a plurality of positions, preferably at three or more positions, for example, four positions as shown in FIG.4. A numeral 58 denotes a base plate connected to the piezostack and the piezostack is screwed to the base plate 58.

Because other structures are the same as those described with FIG. 3, corresponding parts are denoted by the same numerals and its repeated explanation will be omitted.

A case will be described where a beam irradiator provided with a focus controller including the convergent lens 21 shown in FIG. 7 is applied,e,g, to an exposure device for manufacturing a master disk to obtain a stamper for manufacturing an information recording medium.

Figure 8:
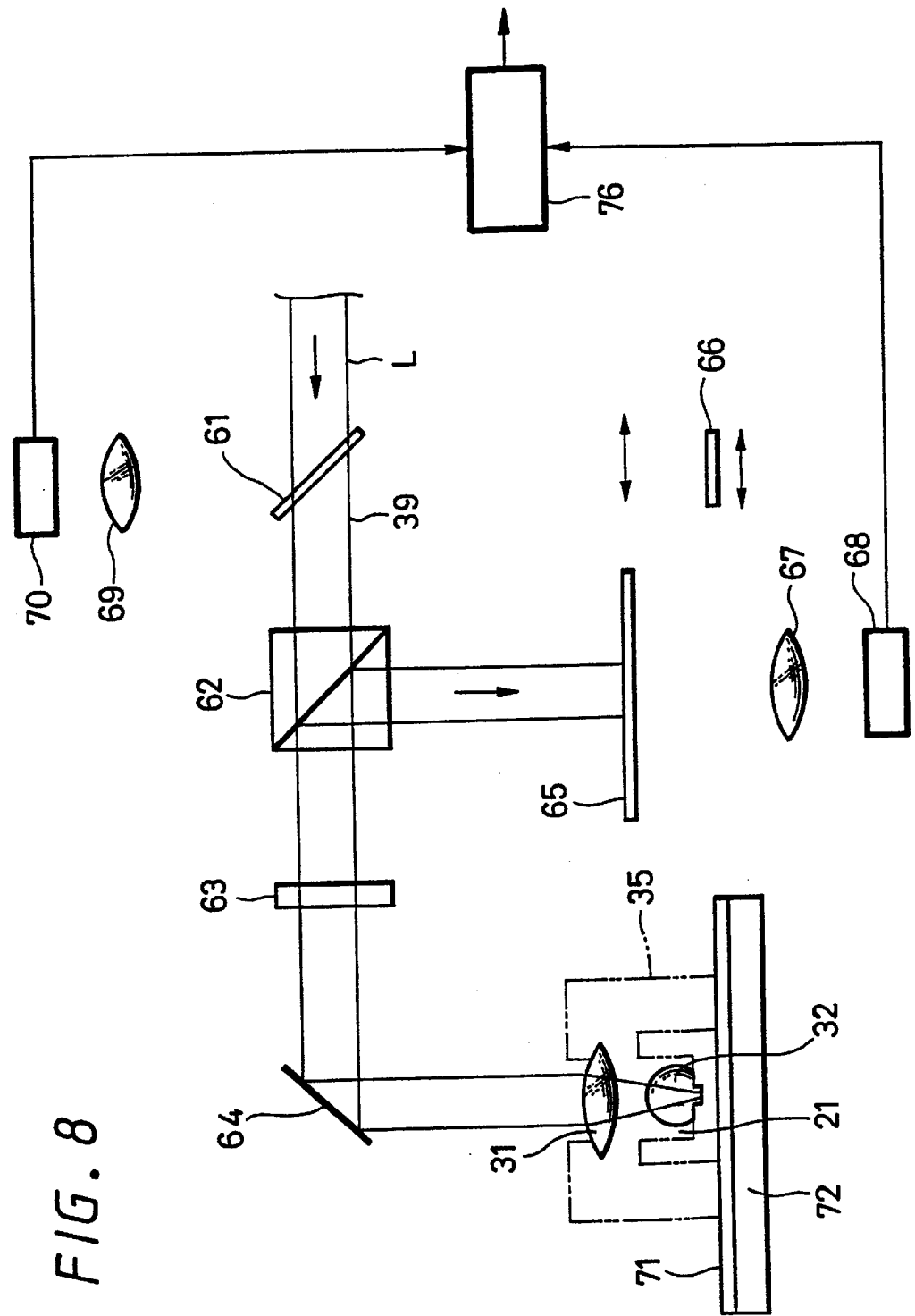
FIG. 8 is a structural diagram showing a method and an apparatus for adjusting a tilt of a convergent lens of an apparatus of the present invention.
Figure 9:
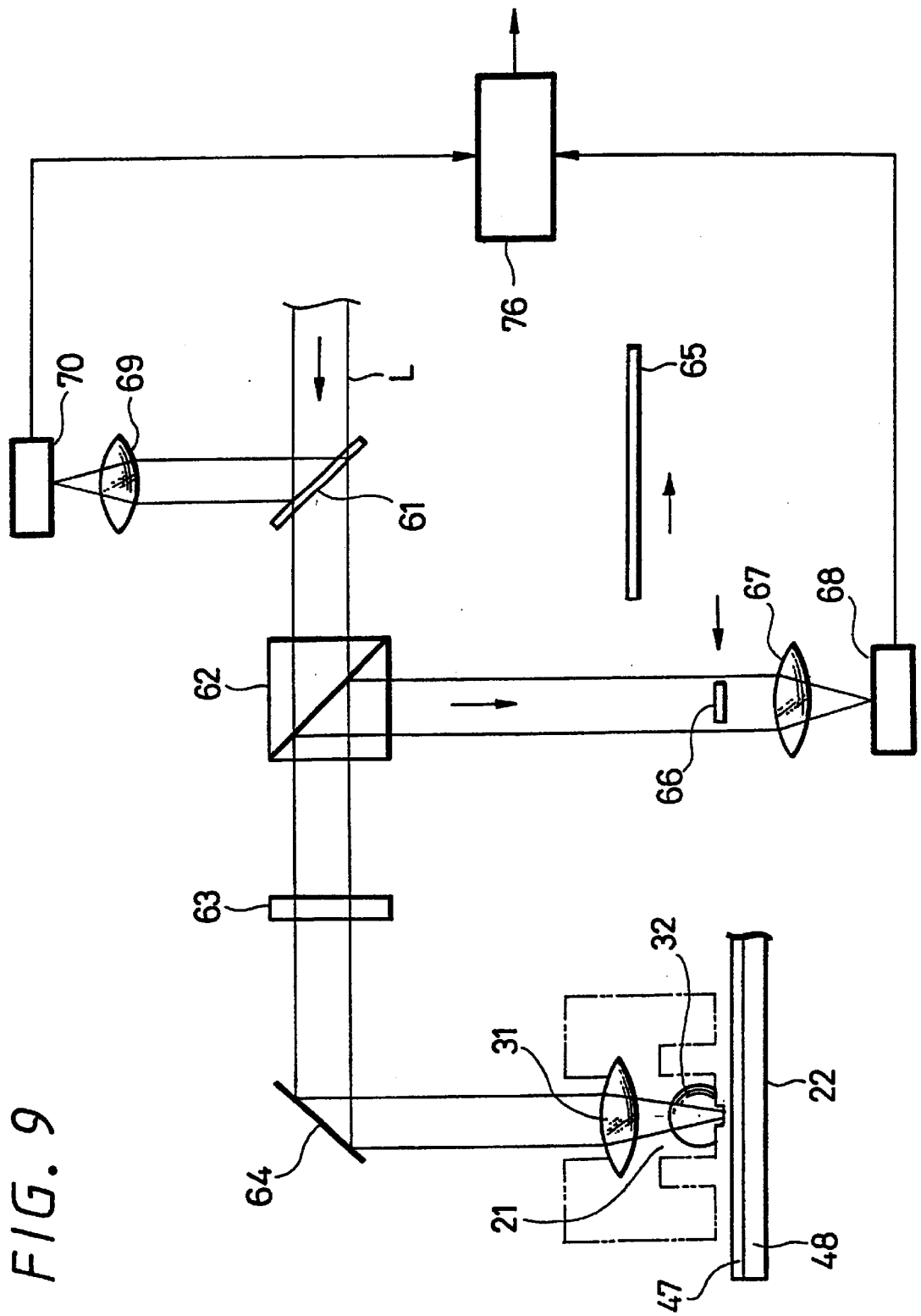
FIG. 9 is a structural diagram showing a totally-reflected-light detecting method used for focus control of an apparatus of the present invention.

FIGS. 8 and 9 show an optical system of the beam irradiator.

The optical system is provided with a beam splitter (e.g. half mirror) 61, a polarized-beam splitter (PBS) 62, a ¼-wavelength plate (QWP) 63, and a mirror 64 on the optical path of a laser beam L emitted from a laser-beam generator (not illustrated) so that converted into parallel rays by a collimator lens (not illustrated) and a laser beam reflected from the mirror 64 may enter a convergent lens 21. Moreover, a screen 65, an opaque mask 66, a condenser lens 67, and a first detection device such as a photodetector 68 are arranged on an optical path which is converted by the polarized-beam splitter 62 converting an optical path of the returned light including the light reflected from the SIL 32 of the convergent lens and the light reflected from the irradiated object 22. The screen 65 and opaque mask 66 are arranged to be movable between a position on the optical path and a position off from the optical path. Further, a second detection device such as a photodetector 70 is set on an optical path of a laser beam reflected from the beam splitter 61 through a condenser lens 69.

First of all, a tilt, i,e, an optical axis of the convergent lens 21 is adjusted.

In the lens-tilt adjusting method, as shown in FIG. 8, a substrate 72 is prepared whose surface is made into a high-reflection plane 71 through metal plating or the like and an air pad 35 provided with the convergent lens 21 is placed on the high-reflection plane 71 of the substrate 72. Under this state, the axis of the air pad 35 is perpendicular to the substrate 72.

A laser beam L emitted from a laser beam generator as linearly-polarized rays and converted into circularly-polarized rays through the beam splitter 61, the polarized-beam splitter 62 and the ¼-wavelength plate 63 is aligned perpendicular to the face of the substrate 72 through the mirror 64 and made to enter the convergent lens 21 in the air pad 35. The returned light reflected from the convergent lens 21, i,e, the bottom plane of the columnar protrusion 32a of the SIL 32 and the substrate 72 is reflected from the mirror 64 and permeates the ¼-wavelength plate 63, thereafter being separated by the polarized-beam splitter 62 for changing its optical path and projected to the screen 65.

The light most of which is totally reflected from the bottom plane of the SIL 32 of the convergent lens 21 returns as an orbicular (so-called ringlike) beam as described below. The beam reflected from the surface 71 of the substrate 72 is scattered by the columnar protrusion 32a of the SIL 32 and its projected image is reflected again from the substrate 72 and returns as a convergent beam. The convergent beam returns as interference light produced between the SIL 32 and the substrate 72.

Figure 10:
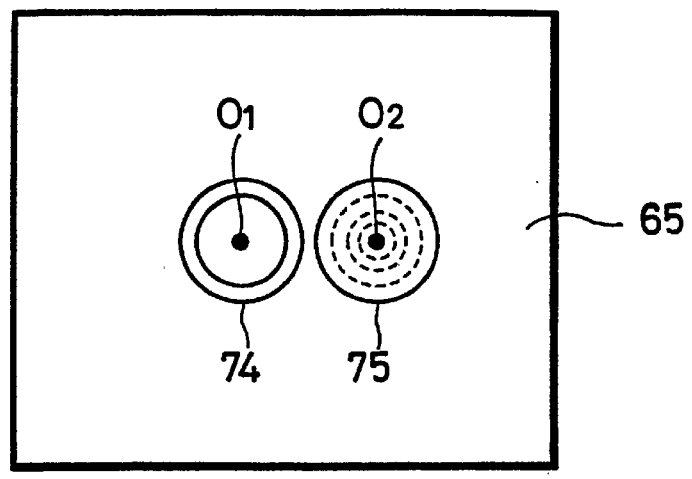
FIG. 10 is an illustration of tilt adjustment of a convergent lens.

Thus, as shown in FIG. 10, the orbicular beam 74 totally reflected from the SIL 32 and interference light (interference fringe) 75 produced between the columnar protrusion 32a at the center of the SIL 32 and the substrate 72 are projected to the screen 65, thereby enabling an offset between their optical axes $O_1$ and $O_2$ to be confirmed.

Assuming that the center of the columnar protrusion 32a of the SIL 32 is aligned with the optical axis, fastening degrees of four screws 56 for fixing the piezostack of the shift means 26 to the air pad 35 through the gel-type sheet 57 are adjusted so that the optical axis of the orbicular beam 74 may be aligned with that of the interference light 75. This makes the optical axis of the convergent lens 21 becomes vertical to both the substrate 72 and the bottom of the air pad 35 and also the bottom plane of the SIL 32 parallel with the substrate 72.

In this example, the gel-type sheet 57 is inserted between contact faces of the air pad 35 and the piezostack of the shift means 26. Alternatively or in addition thereto, the gel-sheet 57 may be inserted between contact faces of the piezostack as the shift means 26 and the lens tube 28 for holding the convergent lens 21.

Figure 12:
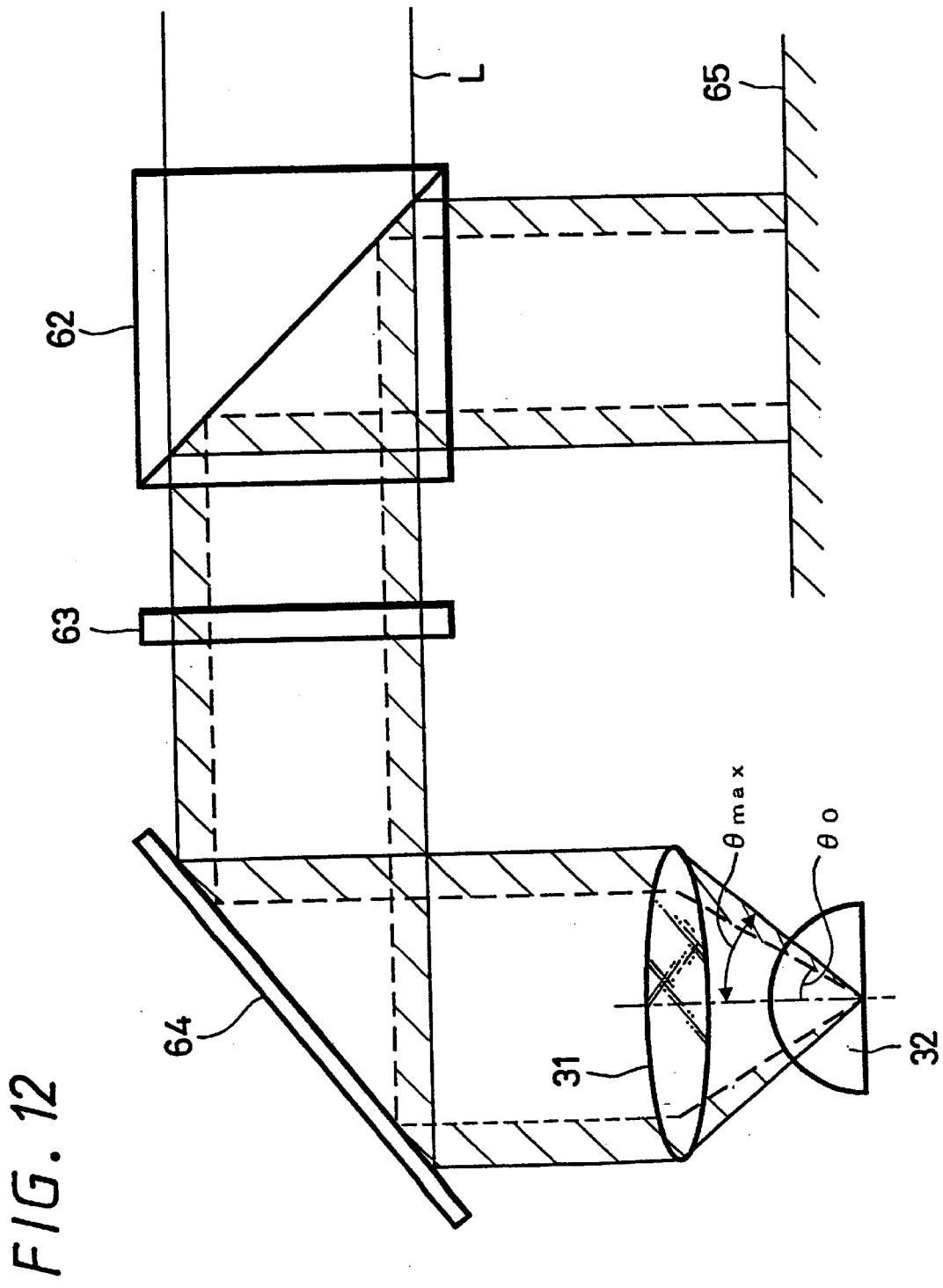
FIG. 12 is an illustration of tilt adjustment of a convergent lens.

In this context, as shown in FIG. 12, when a refractive index n and a maximum incidence angle $\theta_{max}$ are set so that a numerical aperture NA may be equal to a predetermined value, e,g, so that a product n·sin $\theta_0$ concerning a certain incidence angle $\theta_0$ smaller than the maximum incidence angle $\theta_{max}$ and the refractive index n may be equal to 1.0 as described above, the light entering the SIL 32 from the objective lens 21 at an incidence angle at which the numerical aperture becomes larger than the predetermined value, that is, 1 (high-frequency component of incoming light) almost permeates a plane of the SIL 32 facing a substrate when the SIL 32 contacts with the substrate and is irradiated to the substrate if the SIL 32 contacts with the substrate. However, as the SIL 32 moves away from the substrate, the reflectance of the high-frequency component at the facing plane suddenly increases. When the SIL 32 moves away from the substrate beyond the near field, almost 100% of the light is reflected from the facing plane. Therefore, the returned light reflected from the bottom plane of the SIL 32 forms an orbicular shape (see the hatched portion in FIG. 12) and is projected onto the screen 65 as sown in FIG. 10.

Moreover, the light incoming to the SIL 32 from the objective lens 31 at an incidence angle at which the numerical aperture is smaller than the predetermined value, or 1.0 (low-frequency component of incoming light) passes through the SIL 32 and is reflected from the surface of the substrate 72 and projected onto the screen 65 as the interference light 75.

Next, master-disk exposure is started.

The positive-pressure air 49 is jetted (to supply air) from the bottom of the air pad 35 through the air jet port 36, i,e, annularly-arranged porous carbon to float the air pad 35. Then, as shown in FIG. 9, an irradiated object, namely, a master disk 22 having the photoresist layer 47 applied to the surface of the substrate 48 is prepared and the air pad 35 is lowered onto the master disk 22 while keeping the master disk 22 stationary and the air pad 35 horizontal.

When the air pad 35 is lowered until a support load of the air pad 35 becomes 0 by floating, intake by the negative-pressure air 50 (air intake) is performed through the air intake port 37. For example, suppose a supply-air pressure is set at 5 kgf and an intake-air pressure is set at a value equal to atmospheric pressure—100 mmHg. If the intake-air pressure is too high, the air pad 35 may collide with the master disk 22 due to the action of a down-force. Inversely, if the intake-air pressure is too low, the air pad 35 cannot follow a swell on the master disk, if any and will be repelled due to a floating force by positive pressure. Rigidity is produced in an air film depending on the balance between the positive- and negative-air pressures as described with FIG. 3 and so the air pad 35 follows the swell of the master disk 22.

Figure 11:
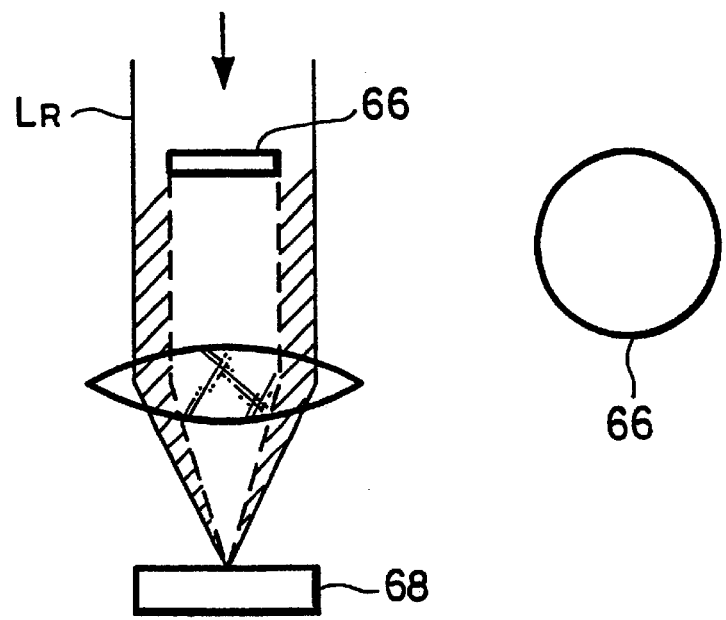
FIG. 11, is an illustration of totally-reflected-light detection.

Then, the exposure step is entered. At this moment, as shown in FIG. 9, the screen 65 retreats to a position out of an optical path and the opaque mask 66 is set into the optical path instead. As shown in FIG. 11, the opaque mask 66 is formed in such a size as interrupts the returned light of a so-called low-frequency component.

During exposure, a predetermined voltage is applied to the piezostack of the shift means 26 and the convergent lens 21 protrudes from the bottom plane of the air pad 35 so that the distance between the SIL 32 of the convergent lens 21 and the master disk 22 may fall within the near field.

A linearly-polarized laser beam emitted from a laser beam generator (not illustrated) is converted into parallel rays by a collimator lens (not illustrated) and enters the polarized-beam splitter 62 after passing through the beam splitter 61. The laser beam L passing through the polarized-beam splitter 62 and converted into circularly-polarized rays by the ¼-wavelength plate 63 is reflected from the mirror 64 to selectively make the photoresist layer 47 on the master disk 22 exposed through the convergent lens 21.

Focus control is performed during the above exposure step.

An exposure beam, i,e, the laser beam L is made to enter the convergent lens 21, a laser beam incoming to the SIL 32 from the objective lens 31 at an incidence angle larger than the above $\theta_0$ (high frequency component) being reflected from the bottom plane of the SIL 32, the reflected laser beam being converted through the objective lens 31 and the mirror 64 into linearly-polarized rays orthogonal to the original rays by the ¼-wavelength plate 63 and reflected from the polarized-beam splitter 62, and the light intensity of the rays being detected by the photodetector 68 for monitoring the beam intensity through the condenser lens 67 as a voltage value.

On the other hand, a part of the laser beam emitted from the laser beam generator is reflected from the beam splitter 61 and the light intensity of the partial laser beam is detected by the photodetector 70 for monitoring the beam intensity as a voltage value through the condenser lens 69.

In this example, the totally-reflected light amount of a laser beam (high-frequency component) when sufficiently moving the SIL 32 away from the master disk 22 is defined as a reference light amount. Therefore, a value obtained by multiplying a value derived from the photodetector 70 by a predetermined coefficient is sent to an arithmetic circuit 76 as a signal corresponding to the reference light amount. A signal showing a light amount detected by the photodetector 68 is also sent to the arithmetic circuit 76.

The arithmetic circuit 76 stores a constant-value level when the distance between the SIL 32 and the master disk 22 is equal to a certain distance, namely, a distance falling within the near field, for example, a level falling down to 60% of the reference light amount as a target control value.

The arithmetic circuit 76 generates a focus-control signal in accordance with the difference between the target control value and a light amount supplied from the photodetector 68. The control signal is sent to the focus-error detection section 46 to control the telescopic motion of the piezostack of the shift means 26 so as to keep the light amount supplied from the photodetector 68 when the light amount reaches the constant-value level relative to the reference light amount. This makes it possible to keep the distance (gap) between the SIL 32 and the master disk 22 constant.

This state, namely, a state in which the totally-reflected light amount decreases is produced when the SIL 32 approaches the master disk 22 within the near field. It can be seen from this fact that if the distance (gap length) can be kept stably, then the distance can be controlled within the near field.

When the distance between the SIL 32 and the master disk 22 becomes equal to or less than a wavelength of a laser beam by controlling the length of the piezostack of the shift means 26, a laser beam of a high-frequency component incoming to the SIL 32 penetrates toward the master disk 22 and thus, a reflected light amount decreases. At this moment, an interference fringe produced between the bottom plane of the SIL 32 and the master disk 22 is superposed on the orbicular totally-reflected returned light due to total reflection and intensity vibrations due to the interference fringe form noises in the distance (gap length) control according to totally-reflected light.

As shown in FIG. 11, however, the circular opaque mask 66 through which the orbicular totally-reflected light (hatched portion) passes is arranged on the optical path of the light LR returning to the photodetector 68, whereby interference light is eliminated and only totally-reflected returned light mainly passes. The opaque mask 66 makes it possible to control intensity vibrations to a degree of not affecting the control of the distance (gap length) between the SIL 32 and the master disk 22.

As the result of feeding back a change of totally-reflected light intensities to a voltage applied to the piezostack of the shift means 26 and servo-controlling the above distance (gap length) to a position of approx. 100 nm while keeping the master disk 22 stationary, fluctuation of the distance (gap length) could be kept within a range of approx. 1 nm at the maximum. Moreover, as the result of rotating the master disk 22 at approx. 600 rpm and performing distance (gap length) control at a position of a radius of approx. 40 mm, the magnitude of the fluctuation could be controlled to approx. 10 nm at the maximum.

As described above, in this example, because of arranging the positive-pressure-air jet port 36 on the outer periphery side of the negative-pressure-air intake port 37, positional balance between jet and intake of air is kept, so that it is possible to float the air pad 35 in a stable attitude.

By retreating the SIL 32 from the bottom plane of the air pad 35, it is possible to avoid collision of the SIL 32 with a master disk except when controlling a near-field gap length.

Because the air pad 35 and shift means 26 are fixed to each other by screws through an elastic member such as the gel-type sheet 57, it is possible to easily perform tilt adjustment, i,e, so-called optical-axis adjustment of the convergent lens 21 with high accuracy using the flexibility of the gel-type sheet 57.

Moreover, it is possible to realize high-accuracy adjustment by a visual easy method in tilt adjustment of the SIL 32 for which a high-accuracy parallelism with the irradiated object 22 is required.

Furthermore, it is possible to increase the intensity of totally-reflected returned light used for the above distance (gap length) control by using the polarized-beam splitter 62 and ¼-wavelength plate 63, control the intensity of interference light forming noises by using the opaque mask 66, and increase a ratio of detection-signal-intensity-to-noise-intensity (S/N ratio) in the distance(gap length) control, which makes the control to be performed with high accuracy.

INDUSTRIAL APPLICABILITY

The above described beam irradiator is not restricted to those used for exposure of the photoresist layer 47. For example, it is possible to form into an optical apparatus serving as an optical recorder for recording information in the irradiated object 22 such as a recordable information recording medium, e,g, the so-called CD-R, or a magneto-optical recording medium having a magneto-optical recording layer, or an information recording medium having a recording layer in which data is recorded in accordance with a phase change, or into an optical apparatus serving as the so-called pickup for reproducing the recorded information.

Moreover, the present invention makes it possible to construct a recording and/or reproducing apparatus for recording and/or reproducing information by comprising an optical apparatus having of the above constructed beam irradiator.

A beam irradiator, focus control method, totally-reflected-light detecting method, and distance-change detecting method relating to the present invention can be applied to purposes other than the above examples.

It is a matter of course that the present invention is not restricted to the above examples and it is able to have any one of other various structures without departing from the gist of the present invention.

What is claimed is:

1. A distance-change detecting method for detecting a change of the distance between a second optical means and an optical recording medium in an optical system having a first optical means for condensing the light to irradiate the optical recording medium and the second optical means being set between the first optical means and the optical recording medium in order to realize a numerical aperture larger than that of the first optical means, the method comprising the steps of:
   detecting the light incident to the second optical means from the first optical means at an incidence angle at which a numerical aperture is larger than a predetermined value and reflected from a plane facing the optical recording medium out of the second optical means;
   detecting the distance change in accordance with the amount of the reflected light;
   calculating a light amount ratio between a high frequency component of the incident light and a high frequency component of the reflected light; and
   controlling a distance between the optical recording medium and the second optical means so that the distance between the disk and the second optical means is constant in a near-field range,
   wherein one of the light incoming to the first optical means and the light incoming to the second optical means is detected, and
   wherein the distance is controlled based on the calculated ratio.

2. The distance-change detecting method according to claim 1, wherein
   the second optical means is a solid immersion lens, and the light incoming to the second optical means from the first optical means at an incidence angle at which a numerical aperture is larger than 1 and reflected from a plane of the second optical means facing the optical recording medium is detected.

3. A distance-change detector for detecting a change of the distance between a second optical means and an optical recording medium in an optical system having a first optical means for condensing the light to irradiate the optical recording medium and the second optical means set between the first optical means and the optical recording medium in order to realize a numerical aperture larger than that of the first optical means, the detector comprising:
   a light detection means for detecting the light incoming to the second optical means from the first optical means at an incidence angle at which a numerical aperture is larger than a predetermined value and reflected from a plane of the second optical means facing the optical recording medium;
   a first detection means for controlling the distance between the optical recording medium and the second optical means so that the-distance between the optical recording medium and the second optical means is constant in a near-field range; and
   a second light-detection means for detecting one of the light incoming to the first optical means and the light incoming to the second optical means,
   wherein the detection means is comprised of comparison means for calculating a ratio between a high frequency component of the incident light and a high frequency component of the reflected light.

4. The distance-change detector according to claim 3, wherein
   the second optical means is a solid immersion lens, and
   the light detection means detects the light incoming to the second optical means from the first optical means at an incidence angle at which a numerical aperture is larger than 1 and reflected from a plane of the second optical means facing the optical recording medium.

5. The distance-change detector according to claim 4, wherein
   a member for controlling reflection of light is formed on at least one of a plane of the second optical means facing the optical recording medium and a portion of the optical recording medium closer to the second optical means than a signal recording plane of the optical recording medium.

6. The distance-change detector according to claim 3, wherein a member for controlling reflection of light is formed on at least one of a plane of the second optical means facing the optical recording medium and a portion of the optical recording medium closer to the second optical means than a signal recording plane of the optical recording medium.

7. The distance-change detector according to claims 3, wherein a member for controlling reflection of light is formed on at least one of a plane of the second optical means facing the optical recording medium and a portion of the optical recording medium closer to the second optical means than a signal recording plane of the optical recording medium.

8. A focus control method for controlling the distance between a second optical means and a optical recording medium in an optical system having a first optical means for condensing the light to irradiate the optical recording medium and a second optical means set between the first optical means and the optical recording medium in order to realize a numerical aperture larger than that of the first optical means, the method comprising the steps of:

detecting the light incident to the second optical means from the first optical means at an incidence angle at which a numerical aperture is larger than a predetermined value and reflected from a plane out of the second optical means facing the optical recording medium;

calculating a light amount ratio between a high frequency component of the incident light and a high frequency component of the reflected light; and controlling a distance between the optical recording medium and the second optical means so that the distance between the optical recording medium and the second optical means is constant in a near-field range, wherein the distance is controlled based on the calculated light amount ratio.

9. The focus control method for controlling the focus of a convergent lens according to claim 8, further comprising the steps of:

floating the convergent lens above the face of an irradiated object by positive-pressure air; and attracting the convergent lens to the irradiated object by negative-pressure air.

10. The focus control method according to claim 9, wherein the distance between the convergent lens and the irradiated object is controlled by controlling the air pressures.

11. The focus control method according to claim 9 or 10, wherein a focal position is corrected by driving the convergent lens with an electrical driving means.

12. A focus controller for controlling the distance between a second optical means and an optical recording medium in an optical system having a first optical means for condensing the light to irradiate the optical recording medium and the second optical means set between the first optical means and the optical recording medium in order to realize a numerical aperture larger than that of the first optical means, the controller comprising:

a light detection means for detecting light incident to the second optical means from the first optical means at an incidence angle at which. a numerical aperture is larger than a predetermined value and reflected from a plane of the second optical means facing the optical recording medium;

a detection means for calculating a light amount ratio between a high frequency component of the incident light and a high frequency component of the reflected light and detecting a distance change in accordance with the calculated ratio; and a control means for controlling the distance between the optical recording medium and the second optical means based on the calculated ratio so that the distance between the optical recording medium and the second optical means is constant in a near-field range.

* * * * *

UNITED STATES PATENT AND TRADEMARK OFFICE
CERTIFICATE OF CORRECTION

PATENT NO.    : 6,845,066 B1
DATED         : January 18, 2005
INVENTOR(S)   : Imanishi Shingo It is certified that error appears in the above-identified patent and that said Letters Patent is hereby corrected as shown below:

Column 20,
Line 39, "the-distance" should read -- the distance --.

Column 21,
Line 7, "claims 3" should read -- claim 4 --.

Column 22,
Line 24, "which. a" should read -- which a --.

Signed and Sealed this

Fifteenth Day of November, 2005

JON W. DUDAS
*Director of the United States Patent and Trademark Office*